United States Patent
Rajvanshi et al.

(10) Patent No.: US 11,794,787 B2
(45) Date of Patent: Oct. 24, 2023

(54) VEHICLE ASSIST FEATURE CONTROL

(71) Applicant: Ford Global Technologies, LLC, Dearborn, MI (US)

(72) Inventors: Akshat Rajvanshi, Novi, MI (US); Benjamin Maus, Düsseldorf (DE); Nitendra Nath, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 17/073,660

(22) Filed: Oct. 19, 2020

(65) Prior Publication Data

US 2022/0119016 A1    Apr. 21, 2022

(51) Int. Cl.
*B60W 60/00* (2020.01)
*B60W 30/12* (2020.01)
(Continued)

(52) U.S. Cl.
CPC ........ *B60W 60/0059* (2020.02); *B60W 30/12* (2013.01); *B60W 30/162* (2013.01); *B60W 40/04* (2013.01); *B60W 2552/53* (2020.02); *B60W 2554/406* (2020.02); *B60W 2554/408* (2020.02)

(58) Field of Classification Search
CPC ............. B60W 60/0059; B60W 30/12; B60W 30/162; B60W 40/04; B60W 2552/53; B60W 2554/406; B60W 2554/408
See application file for complete search history.

(56) References Cited

U.S. PATENT DOCUMENTS 9,449,509 B2    9/2016  Koshizen et al.
2013/0103294 A1*  4/2013  Koshizen .............. G08G 1/00
                                          701/118
(Continued)

FOREIGN PATENT DOCUMENTS

CN    103426309 B  *  5/2015
CN    108001449 A  *  5/2018  ............ B60W 40/04
(Continued)

OTHER PUBLICATIONS

"Measuring traffic congestion—A critical review", Md Aftabuzzaman, Melbourne Polytechnic. Accessed at https://www.researchgate.net/publication/282780229 (Year: 2007).*
(Continued)

*Primary Examiner* — Peter D Nolan
*Assistant Examiner* — Tanya C Sienko
(74) *Attorney, Agent, or Firm* — Frank A. MacKenzie; Bejin Bieneman PLC

(57) ABSTRACT

While operating a host vehicle in a first lane on a road, respective first statistical probabilities of a) an average speed of a plurality of vehicles, including the host vehicle, operating in the first lane, b) an average distance between the vehicles operating in the first lane, and c) an average number of braking events performed by the vehicles operating in the first lane are determined based on sensor data. A high traffic density probability for the road is determined based on the first statistical probabilities. A host vehicle assist feature is transitioned between an enabled state and a disabled state based on the high traffic density probability for the road being greater than a threshold probability.

20 Claims, 4 Drawing Sheets

(51) Int. Cl.
*B60W 30/16* (2020.01)
*B60W 40/04* (2006.01)

(56) References Cited

U.S. PATENT DOCUMENTS

| | | | | |
|---|---|---|---|---|
| 2013/0103295 | A1* | 4/2013 | Koshizen | B60W 40/04 701/119 |
| 2016/0335890 | A1* | 11/2016 | Bernhardt | G08G 1/096758 |
| 2017/0291591 | A1* | 10/2017 | Steer | B60T 8/885 |
| 2017/0330458 | A1* | 11/2017 | Jordan | G08G 1/096775 |
| 2020/0074848 | A1* | 3/2020 | Namba | G06V 20/56 |
| 2020/0086859 | A1* | 3/2020 | McGill, Jr. | G05D 1/0088 |
| 2021/0286365 | A1* | 9/2021 | Jiao | G05D 1/0088 |
| 2021/0327276 | A1* | 10/2021 | Asai | B60W 60/0015 |

FOREIGN PATENT DOCUMENTS

| | | |
|---|---|---|
| CN | 110816540 A | 2/2020 |
| CN | 111081030 A | 4/2020 |
| JP | 4528183 B2 | 6/2010 |
| JP | 2014162451 A | 9/2014 |

OTHER PUBLICATIONS

"Speed Concepts: Informational Guide" U.S. Department of Transportation, Federal Highway Administration (Year: 2009).*

"Hard Braking Event Explained", by Steven M. Gursten, Nov. 5, 2017, law firm blog; accessible at https://www.michiganautolaw.com/blog/2017/11/05/hard-braking/ (Year: 2017).*

P. Gerum, et al, "Traffic density on corridors subject to incidents: models for long-term congestion management" Euro J Transp Logist (2019) 8: 795-831 (Year: 2019).*

A.Zeroual et al., "Road traffic density estimation and congestion detection with a hybrid observer-based strategy", Sustainable Cities and Society 46 (2019) 101411 (Year: 2019).*

"Estimation of driving style in naturalistic highway traffic using maneuver transition probabilities" By Guofa Li et al., Transportation Research Part C 74 (2017) 113-125 (Year: 2017).*

"Failure of classical traffic flow theories: Stochastic highway capacity and automatic driving" by Boris S. Kerner, Physica A 450 (2016) 700-747 (Year: 2016).*

* cited by examiner

VEHICLE ASSIST FEATURE CONTROL

BACKGROUND

Vehicles may include assist features, e.g., blind spot monitor, adaptive cruise control, lane departure warning, lane centering, etc., to aid a user operating the vehicle. Assist features may be adaptive features that actuate one or more vehicle components based on vehicle data, e.g., a sensed location, sensed environmental conditions, etc.

DETAILED DESCRIPTION

Figure 1:
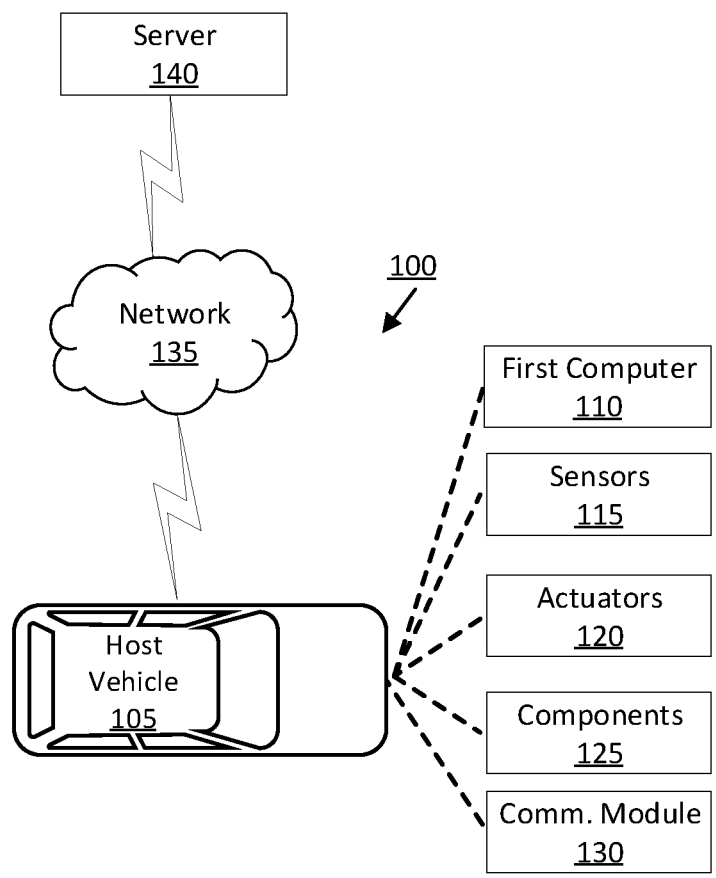
FIG. 1 is a block diagram illustrating an example vehicle control system for a vehicle.

A system includes a computer including a processor and a memory, the memory storing instructions executable by the processor to while operating a host vehicle in a first lane on a road, determine, based on sensor data, respective first statistical probabilities of a) an average speed of a plurality of vehicles, including the host vehicle, operating in the first lane, b) an average distance between the vehicles operating in the first lane, and c) an average number of braking events performed by the vehicles operating in the first lane. The instructions further include instructions to determine a high traffic density probability for the road based on the first statistical probabilities. The instructions further include instructions to transition a host vehicle assist feature between an enabled state and a disabled state based on the high traffic density probability for the road being greater than a threshold probability.

The instructions can further include instructions to, upon determining a second lane is valid, determine, based on sensor data, respective second statistical probabilities of a) an average speed of a plurality of target vehicles operating in the second lane, b) an average distance between the target vehicles operating in the second lane, and c) an average number of braking events performed by the target vehicles in the second lane. The instructions can further include instructions to determine the high traffic density probability for the road additionally based on the second statistical probabilities.

The instructions can further include instructions to determine the high traffic density probability for the road by combining the first statistical probabilities and the second statistical probabilities.

The instructions can further include instructions to determine the second lane is invalid based on identifying the second lane as a departure lane.

The instructions can further include instructions to determine the second lane is invalid based on determining a direction of travel of a vehicle operating in the second lane is opposite a direction of travel of the host vehicle.

The instructions can further include instructions to, upon determining the speed of the host vehicle is between first and second speed thresholds, determine the statistical probability of the average speed of the vehicles operating in the first lane based on the first and second speed thresholds. The second speed threshold is greater than first speed threshold.

The instructions can further include instructions to determine the first and second speed thresholds based on a speed limit for the road.

The instructions can further include instructions to, upon determining the distance between the host vehicle and the lead vehicle is between first and second distance thresholds, determine the statistical probability of the average distance between the vehicles operating in the first lane based on the first and second distance thresholds. The second distance threshold is greater than the first distance threshold.

The instructions can further include instructions to determine the first and second distance thresholds based on a speed limit for the road.

The instructions can further include instructions to increase a count of the number of braking events performed by each vehicle of the plurality of vehicles based on detecting the speed of the respective vehicle transitioning below a transition speed threshold.

The instructions can further include instructions to reset the count of the number of braking events performed by each vehicle based on the distance between each vehicle and a vehicle in front of the respective vehicle being greater than a threshold.

The instructions can further include instructions to reset the count of the number of braking events performed by each vehicle based on the count remaining constant for a predetermined time.

The instructions can further include instructions to reset the count of the number of braking events performed by each vehicle based on the speed of the respective vehicle exceeding a threshold.

The instructions can further include instructions to maintain the host vehicle assist feature in one of the enabled state or the disabled state based on the high traffic density probability for the road being less than or equal to the threshold probability.

A method includes while operating a host vehicle in a first lane on a road, determining, based on sensor data, respective first statistical probabilities of a) an average speed of a plurality of vehicles, including the host vehicle, operating in the first lane, b) an average distance between the vehicles operating in the first lane, and c) an average number of braking events performed by the vehicles operating in the first lane. The method further includes determining a high traffic density probability for the road based on the first statistical probabilities. The method further includes transitioning a host vehicle assist feature between an enabled state and a disabled state based on the high traffic density probability for the road being greater than a threshold probability.

The method can further include, upon determining a second lane is valid, determining, based on sensor data, respective second statistical probabilities of a) an average speed of a plurality of target vehicles operating in the second lane, b) an average distance between the target vehicles operating in the second lane, and c) an average number of braking events performed by the target vehicles in the second lane. The method can further include determining the high traffic density probability for the road additionally based on the second statistical probabilities.

The method can further include determining the high traffic density probability for the road by combining the first statistical probabilities and the second statistical probabilities.

The method can further include, upon determining the speed of the host vehicle is between first and second speed thresholds, determining the statistical probability of the average speed of the vehicles operating in the first lane based on the first and second speed thresholds. The second speed threshold is greater than first speed threshold.

The method can further include, upon determining the distance between the host vehicle and the lead vehicle is between first and second distance thresholds, determining the statistical probability of the average distance between the vehicles operating in the first lane based on the first and second distance thresholds. The second distance threshold is greater than the first distance threshold.

The method can further include increasing a count of the number of braking events performed by each vehicle of the plurality of vehicles based on detecting the speed of the respective vehicle transitioning below a transition speed threshold.

Further disclosed herein is a computing device programmed to execute any of the above method steps. Yet further disclosed herein is a computer program product, including a computer readable medium storing instructions executable by a computer processor, to execute an of the above method steps. A vehicle can include one or more assist features. An assist feature is an operation in a vehicle to actuate one or more vehicle components based on vehicle operating data from vehicle sensors and/or components to assist or supplement user operation of the vehicle. For example, a vehicle computer can at least partially control the vehicle based on the assist features. An example assist feature is lane-keeping, in which the vehicle computer controls actuators and/or components to maintain the vehicle in a lane of a road. The vehicle computer can receive sensor data, e.g., indicating road markings, signs, other vehicles, etc., and can initiate an assist feature, the assist feature including to actuate one or more vehicle components based on the sensor data. However, when the vehicle is operating on a road with a traffic density at or above a saturation point (defined in the context of this document as a traffic density beyond which the speed of traffic (i.e., average speed of vehicles at a point on a road) decreases), i.e., in a traffic jam, the vehicle computer may enable or disable one or more assist features inappropriate or undesirable for the road based on the received sensor data. Advantageously, upon determining a high traffic density probability for the road, the first computer can enable one or more assist features that might otherwise be disabled, e.g., based on received sensor data, and can disable one or more assist features that might otherwise be enabled, e.g., based on received sensor data. The first computer can enable or disable one or more assist features to allow desired actuation of the enabled assist features and prevent undesired actuation of the disabled assist features thereby improving vehicle operation on a road with a traffic density at or above a saturation point.

Figure 2:
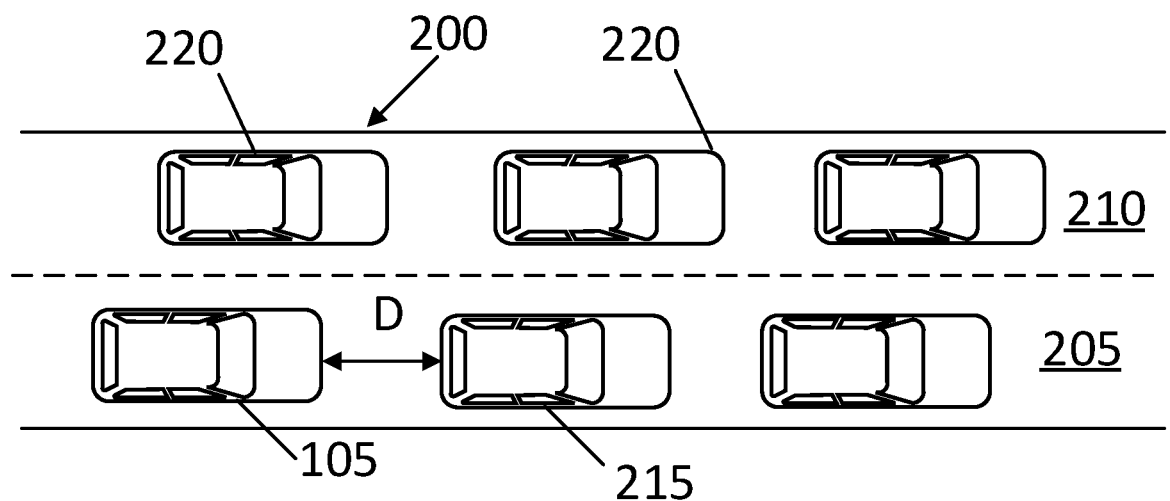
FIG. 2 is a diagram illustrating operating a host vehicle in a first lane on a road including a valid second lane.
Figure 3:
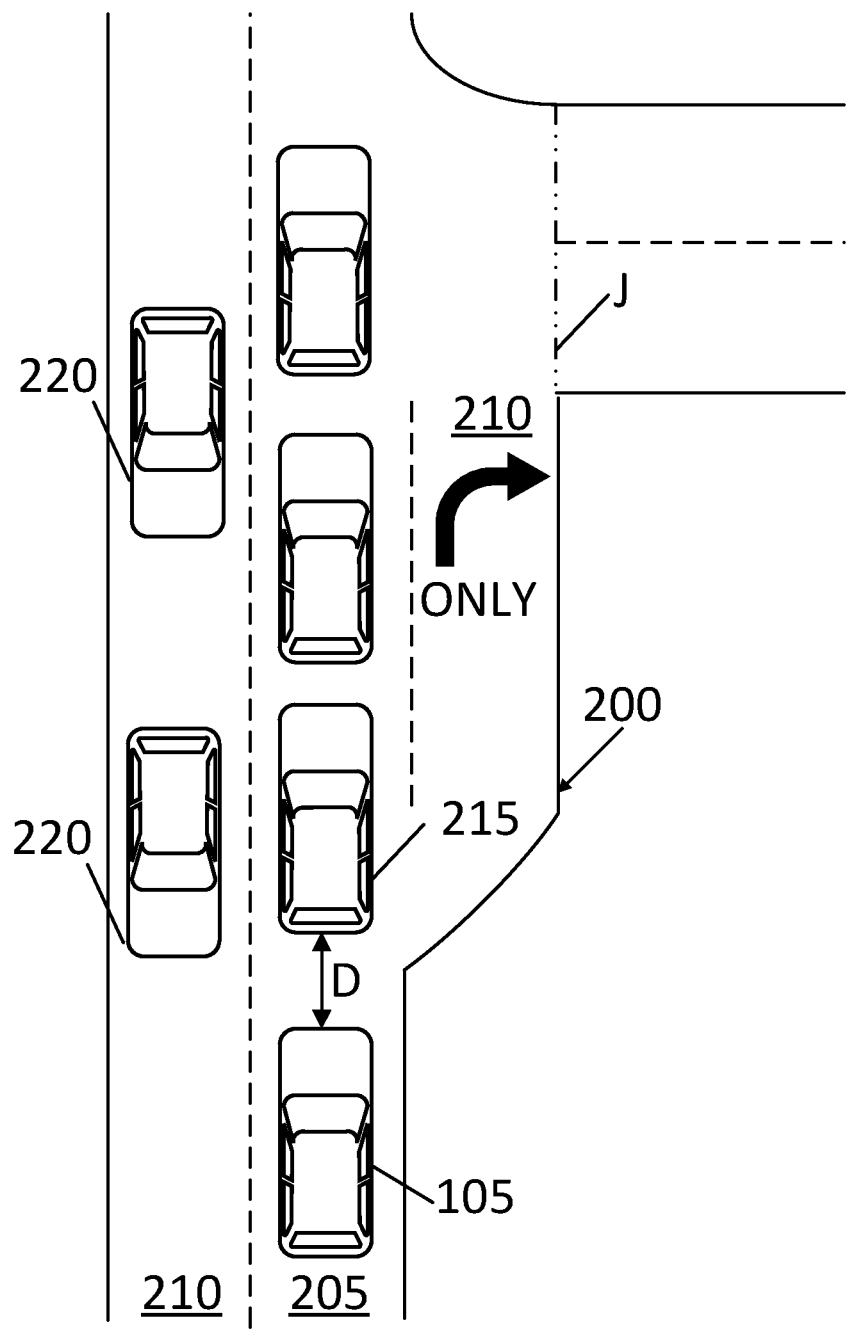
FIG. 3 is a diagram illustrating operating a host vehicle in a first lane on a road including two invalid second lane.

With reference to FIGS. 1-3, an example vehicle control system 100 includes a host vehicle 105. A first computer 110 in the host vehicle 105 receives data from sensors 115. The first computer 110 is programmed to, while operating the host vehicle 105 in a first lane 205 on a road 200, determine, based on sensor 115 data, respective first statistical probabilities of a) an average speed of a plurality of vehicles, including the host vehicle 105, operating in the first lane 205, b) an average distance between the vehicles operating in the first lane 205, and c) an average number of braking events performed by the vehicles operating in the first lane 205. The first computer 110 is further programmed to determine a high traffic density probability for the road 200 based on the first statistical probabilities. The first computer 110 is further programmed to transition a host vehicle 105 assist feature between an enabled state and a disabled state based on the high traffic density probability for the road 200 being greater than a threshold probability.

Turning now to FIG. 1, the host vehicle 105 includes the first computer 110, sensors 115, actuators 120 to actuate various vehicle components 125, and a vehicle communications module 130. The communications module 130 allows the first computer 110 to communicate with a remote server computer 140 and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The first computer 110 includes a processor and a memory such as are known. The memory includes one or more forms of computer-readable media, and stores instructions executable by the first computer 110 for performing various operations, including as disclosed herein. The first computer 110 can further include two or more computing devices operating in concert to carry out host vehicle 105 operations including as described herein. Further, the first computer 110 can be a generic computer with a processor and memory as described above and/or may include a dedicated electronic circuit including an ASIC that is manufactured for a particular operation, e.g., an ASIC for processing sensor data and/or communicating the sensor data. In another example, the first computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the first computer 110.

The first computer 110 may operate the host vehicle 105 in an autonomous, a semi-autonomous mode, or a non-autonomous (or manual) mode. For purposes of this disclosure, an autonomous mode is defined as one in which each of host vehicle 105 propulsion, braking, and steering are controlled by the first computer 110; in a semi-autonomous mode the first computer 110 controls one or two of host vehicle 105 propulsion, braking, and steering; in a non-autonomous mode a human operator controls each of host vehicle 105 propulsion, braking, and steering.

The first computer 110 may include programming to operate one or more of host vehicle 105 brakes, propulsion (e.g., control of acceleration in the host vehicle 105 by controlling one or more of an internal combustion engine, electric motor, hybrid engine, etc.), steering, transmission, climate control, interior and/or exterior lights, horn, doors, etc., as well as to determine whether and when the first computer 110, as opposed to a human operator, is to control such operations.

The first computer 110 may include or be communicatively coupled to, e.g., via a vehicle communications network such as a communications bus as described further below, more than one processor, e.g., included in electronic controller units (ECUs) or the like included in the host vehicle 105 for monitoring and/or controlling various vehicle components 125, e.g., a transmission controller, a brake controller, a steering controller, etc. The first computer 110 is generally arranged for communications on a vehicle communication network that can include a bus in the host vehicle 105 such as a controller area network (CAN) or the like, and/or other wired and/or wireless mechanisms.

Via the host vehicle 105 network, the first computer 110 may transmit messages to various devices in the host vehicle 105 and/or receive messages (e.g., CAN messages) from the various devices, e.g., sensors 115, an actuator 120, ECUs, etc. Alternatively, or additionally, in cases where the first computer 110 actually comprises a plurality of devices, the vehicle communication network may be used for communications between devices represented as the first computer 110 in this disclosure. Further, as mentioned below, various controllers and/or sensors 115 may provide data to the first computer 110 via the vehicle communication network.

Host vehicle 105 sensors 115 may include a variety of devices such as are known to provide data to the first computer 110. For example, the sensors 115 may include Light Detection And Ranging (LIDAR) sensor(s) 115, etc., disposed on a top of the host vehicle 105, behind a host vehicle 105 front windshield, around the host vehicle 105, etc., that provide relative locations, sizes, and shapes of objects surrounding the host vehicle 105. As another example, one or more radar sensors 115 fixed to host vehicle 105 bumpers may provide data to provide locations of the objects, second vehicles, etc., relative to the location of the host vehicle 105. The sensors 115 may further alternatively or additionally, for example, include camera sensor(s) 115, e.g. front view, side view, etc., providing images from an area surrounding the host vehicle 105. In the context of this disclosure, an object is a physical, i.e., material, item that has mass and that can be represented by physical phenomena (e.g., light or other electromagnetic waves, or sound, etc.) detectable by sensors 115. Thus, the host vehicle 105, as well as other items discussed herein, fall within the definition of "object" herein.

The first computer 110 is programmed to receive data from one or more sensors 115 substantially continuously, periodically, and/or when instructed by a remote server computer 140, etc. The data may, for example, include a location of the host vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the host vehicle 105. As one example, the data may be image data of the environment around the host vehicle 105. In such an example, the image data may include one or more objects, e.g., a second vehicle 220, and/or markings, e.g., lane markings, on or along a road 200 on which a host vehicle 105 is currently operating. Image data herein means digital image data, e.g., comprising pixels with intensity and color values, that can be acquired by camera sensors 115. The sensors 115 can be mounted to any suitable location in or on the host vehicle 105, e.g., on a host vehicle 105 bumper, on a host vehicle 105 roof, etc., to collect images of the environment around the host vehicle 105.

The host vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a host vehicle 105.

In the context of the present disclosure, a vehicle component 125 is one or more hardware components adapted to perform a mechanical or electro-mechanical function or operation-such as moving the host vehicle 105, slowing or stopping the host vehicle 105, steering the host vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component 125 (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the first computer 110 may be configured for communicating via a vehicle-to-vehicle communication module 130 or interface with devices outside of the host vehicle 105, e.g., through a vehicle-to-vehicle (V2V) or vehicle-to-infrastructure (V2X) wireless communications (cellular and/or DSRC., etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a first computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

Turning now to FIG. 2, a host vehicle 105 is illustrated operating in a first lane 205 of an example road 200. A lane is a specified area of the road for vehicle travel. A road in the present context is an area of ground surface that includes any surface provided for land vehicle travel. A road is defined with boundaries, e.g., by geo-fencing. A lane of a road is an area defined along a length of a road, typically having a width to accommodate only one vehicle, i.e., such that multiple vehicles can travel in a lane one in front of the other, but not abreast of, i.e., laterally adjacent, one another.

The first computer 110 may, for example, identify a current road 200 of host vehicle 105 operation based on data, e.g., map data, received from a remote server computer 140, e.g., via the network 135. In such an example, the geo-fence specifies a perimeter of the road 200 according to geo-coordinates, e.g., such as are used in the Global Positioning System (GPS) that specify lines defining boundaries, i.e., the perimeter, of the road 200. The first computer 110 can then determine the host vehicle 105 is on the road 200 based on the location data of the host vehicle 105 indicating the host vehicle 105 is within the geo-fence.

Upon identifying the current road 200 of host vehicle 105 operation, the first computer 110 may determine one or more characteristics of the current road 200, i.e., physical quantities that describe measurements and/or limitations of the road 200. For example, road 200 characteristics can include a curvature, an inclination, a speed limit, number of lanes, etc. The first computer 110 can, for example, determine the road 200 characteristics based on map data. The first computer 110 can then determine a type of the current road 200 based on the characteristics of the current road 200. A type of road specifies a number of lanes and expected speed ranges for vehicle use on the road. Each type of road is defined by a plurality of predefined characteristics. For example, the first computer 110 can select the type of the current road 200 from a plurality of types of roads, e.g., stored in a look-up table, corresponding to the predefined characteristics of the road. That is, the first computer 110 can select the type of road that corresponds to the determined characteristics of the current road 200 in the look-up table. The look-up table may be stored, e.g., in a memory of the first computer 110. A road type can be identified by an identifier that describes the road type. Non-limiting examples of types of roads include: highways, freeways, expressways, service drives, side streets, off-ramps, on-ramps. The plurality of predefined characteristics for each type of road may be specified, e.g., by government regulations.

While operating the host vehicle 105 on the road 200, the first computer 110 is programmed to identify a first lane 205, i.e., a lane in which the host vehicle 105 is operating, and one or more second lanes 210, i.e., a lane in which the host vehicle 105 is not operating, on the road 200. For example, the first computer 110 can receive map data and/or location data, e.g., GPS data, from the remote server computer 140 specifying the first lane 205 and the second lane(s) 210. As another example, the first computer 110 may identify the first lane 205 and the second lane(s) 210 based on sensor 115 data. That is, the first computer 110 can be programmed to receive sensor 115 data, typically, image data, from sensors 115 and to implement various image processing techniques to identify the first lane 205 and the second lane(s) 210. For example, lanes can be indicated by markings, e.g., painted lines on the road 200, and image recognition techniques, such as are known, can be executed by the first computer 110 to identify the first lane 205. For example, the first computer 110 can identify solid lane markings on opposite sides of the host vehicle 105. The first computer 110 can then identify the first lane 205 of host vehicle 105 operation based on a number of groups of dashed lane markings between each side of the host vehicle 105 and the respective solid lane marking. A solid lane marking is a marking extending continuously, i.e., is unbroken, along a length of a road and defining at least one boundary of a lane. A group of dashed lane markings includes a plurality of markings spaced from each other along a length of a road and defining at least one boundary of a lane. Additionally, the first computer 110 can determine the second lane(s) 210 on each side of the first lane 205 based on the number of groups of dashed lane markings on each side of the host vehicle 105 (e.g., a number of second lanes is equal to the number of groups of dashed lane markings).

Upon identifying one or more second lanes 210, the first computer 110 can be programmed to validate each second lane 210 on the road 200. A valid lane is a lane that permits vehicles to operate in a same direction of travel as the first lane 205 and continues along the road 200. An invalid lane is a lane that either permits vehicles to operate in a different direction of travel as the first lane 205, or terminates on the road 200. For example, as discussed further below, the first computer 110 can validate each second lane 210 based on a direction of travel of vehicles in the respective second lane 210. When the direction of travel of vehicles in a second lane 210 is the same as the direction of travel of the host vehicle 105 (see FIG. 2), the first computer 110 can validate the second lane 210. When the direction of travel of vehicles in a second lane 210 is opposite the direction of travel of the host vehicle 105 (see FIG. 3), the first computer 110 can invalidate the second lane 210.

As another example, the first computer 110 can validate each second lane 210 based on a classification of the second lane 210. A classification of a lane describes whether the lane continues along or terminates on a road. When a second lane 210 is classified as a through lane, the first computer 110 can validate the second lane 210. A through lane is a lane that directs vehicles along a current road 200. That is, a through lane continues along the current road 200. Said differently, vehicles operating in a through lane remain on a current road 200. When a second lane 210 is classified as a departure lane, the first computer 110 can invalidate the second lane 210. A departure lane is a lane that directs vehicles across the junction. For example, a departure lane may terminate on a current road 200. In other words, the departure lane may extend along the current road 200 to the junction.

The first computer 110 can determine a direction of travel of vehicles in each second lane 210 based on sensor 115 data and/or map data, e.g., stored in the memory of the first computer 110 or received from the remote server computer 140 via the network 135. For example, the first computer 110 can detect a target vehicle 220 operating in a second lane 210. The first computer 110 can then identify, e.g., using image processing and recognition techniques, a front or a rear of the target vehicle 220 via image data. For example, the first computer 110 can identify headlamps or backup lights, respectively, of the target vehicle 220 in image data. The first computer 110 can determine the direction of travel of the target vehicle 220 in the second lane 210 based on detecting the front or the rear of the target vehicle 220. When the first computer 110 detects a front of the target vehicle 220, the first computer 110 determines the direction of travel of the target vehicle 220 in the second lane 210 is opposite the direction of travel of the host vehicle 105 in the first lane 205 (see FIG. 3). When the first computer 110 detects a rear of the target vehicle 220, the first computer 110 determines the direction of travel of the target vehicle 220 in the second lane 210 is the same as the direction of travel of the host vehicle 105 in the first lane 205 (see FIG. 2).

The first computer 110 can determine a classification for each second lane 210 based on identifying a junction with a first (e.g., current) road 200 and a second road. For example, upon identifying the junction, the first computer 110 can classify each second lane 210 on the road 200 as one of a through lane or a departure lane. The first computer 110 can be programmed to identify the junction based on sensor 115 data, map data, and/or data received from the remote server computer 140. As used herein, a junction is defined by a line J that demarcates the second road from the current road 200. That is, a vehicle transitions from operating on the current road 200 to the second road at the junction. For example, the line J may extend across the second road where the second road meets the current road 200 (see FIG. 3). In such an example, the line J is defined by a first point on one side of the second road and a second point on the other side of the second road. Specifically, the first point is a location, e.g., specified by geo-coordinates, where the one side of the second road meets the current road 200, and the second point is a location, e.g., specified by geo-coordinates, where the other side of the second road meets the current road 200.

The first computer 110 may, for example, identify the junction based on map data, e.g., received from the remote server computer 140. For example, the map data may specify geo-fences, i.e., boundary or containment lines specified by geo-coordinates, of the current road 200 and the second road. The first computer 110 can determine the junction based on a portion of the geo-fence for the second road overlapping a portion of the geo-fence for the current road 200. Additionally, or alternatively, the first computer 110 can detect a sign, or marker, proximate to (i.e., within sensor and/or visual range) the host vehicle 105 via image data. For example, a marker may be painted lines, symbols, and/or words on the road 200 (see FIG. 3). As another example, a road sign posted alongside the road 200 may include symbols and/or words. The first computer 110 can compare a detected sign, i.e., an image of the sign, to a plurality of images of signs, e.g., stored in a look-up table or the like, and identify the junction based on the detected sign matching a stored sign identifying the junction.

Returning to FIG. 2, while operating in the first lane 205, the first computer 110 can receive sensor 115 data, e.g., image data, of the environment around the host vehicle 105 in the first lane 205. The image data can include one or more vehicles traveling on the road 200 around the host vehicle 105. For example, object classification or identification techniques, can be used, e.g., in the first computer 110 based on lidar sensor 115, camera sensor 115, etc., data to identify a type of object, e.g., a vehicle, a bicycle, a drone, etc., as well as physical features of objects.

Various techniques such as are known may be used to interpret sensor 115 data and/or to classify objects based on sensor 115 data. For example, camera and/or lidar image data can be provided to a classifier that comprises programming to utilize one or more conventional image classification techniques. For example, the classifier can use a machine learning technique in which data labeled as representing various objects, is provided to a machine learning program for training the classifier. Once trained, the classifier can accept as input vehicle sensor 115 data, e.g., an image, and then provide as output, for each of one or more respective regions of interest in the image, an identification and/or a classification (i.e., movable or non-movable) of one or more objects or an indication that no object is present in the respective region of interest. Further, a coordinate system (e.g., polar or cartesian) applied to an area proximate to the host vehicle 105 can be used to specify locations and/or areas (e.g., according to the host vehicle 105 coordinate system, translated to global latitude and longitude geo-coordinates, etc.) of objects identified from sensor 115 data.

Yet further, the first computer 110 could employ various techniques for fusing (i.e., incorporating into a common coordinate system or frame of reference) data from different sensors 115 and/or types of sensors 115, e.g., lidar, radar, and/or optical camera data.

Upon identifying an object as a vehicle, the first computer 110 is programmed to identify the vehicle as a lead vehicle 215 or a target vehicle 220 based on a lane of vehicle operation. A target vehicle 220 is a vehicle operating in a second lane 210. A lead vehicle 215 is a vehicle operating in the first lane 205 and forward of the host vehicle 105. The first computer 110 may determine an identified vehicle 215, 220 is forward of the host vehicle 105 based on image data from a forward-facing camera. Forward of the host vehicle 105 means that a rearmost point of the identified vehicle 215, 220 is forward of a frontmost point of the host vehicle 105.

The first computer 110 may, for example, programmed to determine a lane of operation for an identified vehicle 215, 220 based on sensor 115 data. For example, the first computer 110 may determine the lane of operation of the identified vehicle 215, 220 by using image data to identify lane markings on each side of the identified vehicle 215, 220, e.g., according to image processing techniques, as discussed above. In such an example, the first computer 110 can determine the identified vehicle 215 is in the first lane 205 when the number of lanes on each side of the identified vehicle 215 is the same as the number of lanes on the respective side of the host vehicle 105. Additionally, or alternatively, the first computer 110 may receive location data from the identified vehicle 215, 220, e.g., via V2V communications, specifying the lane of operation of the identified vehicle 215, 220.

As another example, the classifier can be further trained with data known to represent various lanes of operation. Thus, in addition to identifying the object as a vehicle, the classifier can output an identification of a target vehicle 220 or a lead vehicle 215 based on the lane of vehicle operation. Once trained, the classifier can accept as input host vehicle sensor 115 data, e.g., an image, and then provide as output for each of one or more respective regions of interest in the image, an identification of a target vehicle 220 based on the vehicle operating in a second lane 210, or that no target vehicle 220 is present in the respective region of interest based on detecting no vehicle operating in a second lane 210. Additionally, once trained, the classifier can accept as input host vehicle sensor 115 data, e.g., an image, and then provide as output for each of one or more respective regions of interest in the image, an identification of a lead vehicle 215 based on the vehicle being forward of the host vehicle 105 and operating in a first lane 205, or that no lead vehicle 215 is present in the respective region of interest based on detecting no vehicle forward of the host vehicle 105 and operating in the first lane 205.

The first computer 110 can be programmed to determine a number of lead vehicles 215 operating in the first lane 205 and a number of target vehicles 220 operating in each second lane 210. The first computer 110 can determine the number of lead vehicles 215 based on image data, e.g., using image processing techniques. For example, the first computer 110 can count a number of lead vehicles 215 identified in image data. Similarly, the first computer 110 can determine the number target of vehicles 220 based on image data, e.g., using image processing techniques. For example, the first computer 110 can count a number of target vehicles 220 in each second lane 210 identified in image data.

The first computer 110 may be programmed to selectively activate one or more assist features to an enabled state or a disabled state based on one or more characteristics of the road 200 (as discussed above). For example, the first computer 110 can disable the assist feature(s) that are inappropriate or undesirable for the road 200. That is, the first computer 110 does not operate the host vehicle 105 on the road 200 based on the disabled assist feature(s). The assist feature(s) to be disabled may be specified by a vehicle and/or component manufacturer and stored in the memory of the first computer 110, e.g., in a look-up table or the like. For example, the first computer 110 may activate the assist feature(s) to the disabled state based on e.g., the type of the road 200, the speed limit of the road 200, etc.

As another example, the first computer 110 can enable the assist feature(s) that are appropriate or desirable for the road 200. That is, the first computer 110 operates the host vehicle 105 on the road 200 based on the enabled assist feature(s). The assist feature(s) to be enabled may be specified by a vehicle and/or component manufacturer and stored in the memory of the first computer 110, e.g., in a look-up table or the like. For example, the first computer 110 may activate the assist feature(s) to the enabled state based on e.g., the type of the road 200, the speed limit of the road 200, etc.

In the enabled state, the first computer 110 operates the host vehicle 105 based at least partially on the assist features. For example, the first computer 110 may initiate one or more assist features to supplement or assist the user in operating the host vehicle 105 on a road 200 based on sensor 115 data. That is, the first computer 110 may initiate one or more assist features to aid the user in operating the host vehicle 105 in the first lane 205 based on sensor 115 data. Said differently, the first computer 110 can actuate one or more vehicle components 125 to adjust operation of the host vehicle 105 based data about the environment around the host vehicle 105. For example, the first computer 110 can adjust a speed of the host vehicle 105, e.g., according to the speed of other vehicles operating on the road 200, based on an adaptive cruise control assist feature. As another example, the first computer 110 can operate the host vehicle 105 to maintain at least a minimum distance from a lead vehicle 215. As yet another example, the first computer 110 can according to a lane-keeping assist feature adjust lateral movement of the host vehicle 105 within a first lane 205 of the road 200.

In the disabled state, the first computer 110 suppresses the assist feature(s). That is, the first computer 110 does not initiate the disabled assist feature(s) to supplement or assist the user in operating the host vehicle 105 on the road 200. Non-limiting examples of assist features include adaptive cruise control, blind spot monitor, lane departure warning, lane keep assist, lane centering, forward collision warning, etc.

The first computer 110 is programmed to transition one or more assist features between the enabled state and the disabled state based on a high traffic density probability for the road 200. As used herein, a high traffic density probability is a scalar value, e.g., between 0 and 1, indicating a likelihood that a traffic density of the road 200 is at or above a saturation point. The first computer 110 can compare the high traffic density probability to a threshold probability. When the high traffic density probability is greater than the threshold probability, the first computer 110 can disable one or more assist features that are typically enabled based on the characteristics of the road 200. Additionally, when the high traffic density probability is greater than the threshold probability, the first computer 110 can enable one or more assist features that are typically disabled based on the characteristics of road 200. When the high traffic density probability is less than the threshold probability, the first computer 110 can maintain the assist features in the respective enabled state or disabled state, e.g., according to the characteristic(s) of the road 200.

The threshold probability may be stored, e.g., in a memory of the first computer 110. The threshold probability specifies a scalar value, e.g., between 0 and 1, above which the first computer 110 transitions one or more assist features between the enabled state or the disabled state. The threshold probability can be determined empirically, e.g., based on determining a value that corresponds to a traffic density of the road 200 being equal to a saturation point for the road 200.

Traffic density is a number of vehicles per unit distance along a length of a road, e.g., a number of vehicles per kilometer. The first computer 110 can determine the traffic density of the road 200 based on sensor 115 data and/or data received from one or more remote computers, e.g., the remote server computer 140, a computer in another vehicle, etc. For example, the first computer 110 can receive sensor 115 data, e.g., image data, of the environment around the host vehicle 105, as discussed above. The first computer 110 can then count the number of vehicles traveling in the same direction as the host vehicle 105 along a section of the road 200, e.g., using image processing techniques, and divide that number by the length of the section of the road 200. The first computer 110 can determine the length of the section based on fields of view of the sensors 115, e.g., stored in a memory of the first computer 110. In such an example, the first computer 110 can receive, e.g., via V2V communication, a of traffic density of a plurality of sections of the road 200, from lead vehicles 215 and/or target vehicles 220 operating on the road 200. In this situation, the first computer 110 can then combine (e.g., by averaging or some other statistical measure) the traffic densities for each section of the road 200 to determine the traffic density of the road 200. Additionally, or alternatively, the first computer 110 can receive map data that specifies the traffic density of the road 200 from the remote server computer 140, e.g., via the network 135.

Upon determining the traffic density of the road 200, the first computer 110 can compare the traffic density to a threshold density. The threshold density is chosen to indicate congested traffic. For example, the threshold density can be chosen to be sufficiently high that the speed of traffic is decreasing as a result of the traffic density, i.e., to correspond to a saturation point of the traffic density. The threshold density corresponds to the predetermined saturation point for the number of lanes in the first direction along the road 200, and the threshold density is stored in the memory of the first computer 110.

In general, as traffic density increases, average speed of traffic remains constant until the traffic density reaches a saturation point, which is defined as a traffic density beyond which the speed of traffic (i.e., average speed of vehicles at a point on a road) decreases. The saturation point typically depends on the number of lanes of traffic in a direction and can be determined experimentally by observing the road 200 over time, i.e., by gathering empirical data. The saturation point is a predetermined quantity for a given road 200, direction, and number of lanes in that direction. The saturation point can be experimentally, i.e., empirically, determined by making many observations of the number of vehicles on the road 200 and the speeds of the vehicles, from which traffic density and average speed can be calculated.

The first computer 110 can determine the high traffic density probability for the road 200 based on operating parameters of vehicles 105, 215, 220 operating on the road 200. An operating parameter herein means a measurable physical parameter, i.e., a measurement of a physical phenomenon, for a vehicle and/or the vehicle environment. A variety of operating parameters may be determined for a vehicle 105, 215, 220 operating on the road 200. A non-limiting list of operating parameters includes a speed of each vehicle, a distance between vehicles in the same lane, a number of braking events performed by each vehicle, etc.

The first computer 110 can, for example, determine the high traffic density probability for the road 200 based on Equation 1 below:

$$P(\text{Traffic}) = w_1 P(\text{Speed}|\text{Traffic}) + w_2 P(\text{Distance}|\text{Traffic}) + w_3 P(\text{Brake}|\text{Traffic}) \quad (1)$$

where P(Traffic) represents the high traffic density probability for the road 200, P(Speed|Traffic) represents a speed probability for the road 200 given a traffic density of the road 200 is greater than or equal to the saturation point of the road 200, P(Distance|Traffic) represents a distance probability for the road 200 given the traffic density of the road 200 is greater than or equal to the saturation point of the road 200, P(Brake|Traffic) represents a braking probability given the traffic density of the road 200 is greater than or equal to the saturation point of the road 200, and $w_1$, $w_2$, and $w_3$ are weights, e.g., between 0 and 1. The weights $w_1$, $w_2$, and $w_3$ may be empirically determined by making many observations of the number of vehicles on the road 200, the speeds of the vehicles, distances between the vehicles on the road 200, and the number of braking events performed by vehicles on the road 200.

The first computer 110 can determine P(Speed|Traffic) based on an average speed of the vehicles 105, 215, 220 operating on the road 200. For example, the first computer 110 can determine an average speed of the host vehicle 105 based on sensor 115 data. Additionally, the first computer 110 can determine an average speed of the lead vehicle(s) 215 operating in the first lane 205 and an average speed of the target vehicles 220 operating in each valid second lane 210 based on sensor 115 data and/or data received from one or more remote computers, e.g., the remote server computer 140, a computer in another vehicle, etc. That is, the first computer 110 may ignore invalid second lanes 210 when determining P(Speed|Traffic). Based on the respective average speeds, the first computer 110 can determine a speed probability for the first lane 205 given a traffic density for the first lane 205 is greater than or equal to a saturation point of the first lane 205 (herein after referred to as a "first speed probability") and a speed probability for each valid second lane 210 given a traffic density for the respective second lane 210 is greater than or equal to a saturation point of the respective second lane 210 (herein after referred to as a "second speed probability"). The first computer 110 can then combine (e.g., by averaging and/or using some other statistical measure) the first speed probability and the second speed probability. The first computer 110 can, for example, determine P(Speed|Traffic) based on Equation 2 below:

$$P(\text{Speed} | \text{Traffic}) = \frac{\sum_{L=1}^{n+1} P(\text{Speed} | \text{Traffic})_L}{n+1} \quad (2)$$

where $P(\text{Speed}|\text{Traffic})_L$ represents a speed probability for a lane 205, 210 given a traffic density for the lane 205, 210 is greater than or equal to a saturation point of the lane 205, 210, and n is a number of valid second lanes 210 on a road 200.

The traffic density for each lane 205, 210 is a number of vehicles 105, 215, 220 per unit distance along the respective lane 205, 210. The traffic density for each lane 205, 210 can be determined in substantially the same manner as the traffic density of the road 200 (as discussed above). The saturation point for each lane 205, 210 is defined as a traffic density beyond which the speed of traffic (i.e., average speed of vehicles at a point on a road) decreases in the respective lane 205, 210. The saturation point for each lane 205, 210 can be determined in substantially the same manner as the saturation point for the road 200, as explained above.

To determine the first speed probability, the first computer 110 can compare the average speed of the vehicles 105, 215 in the first lane 205 to a first speed threshold. The first speed threshold specifies a minimum speed of vehicles operating in a lane below which the first computer 110 can determine a traffic density for the lane is greater than or equal to a saturation point of the lane. The first speed threshold may be determined based on the speed limit of the road 200. For example, the first speed threshold may be a predetermined percentage, e.g., 25%, of the speed specified by the speed limit of the road 200. That is, the first computer 110 can determine the first speed threshold by multiplying the predetermined percentage (e.g., stored in a memory of the first computer 110) and a speed limit for the road 200.

As another example, the first computer 110 can select the first speed threshold from a plurality of first speed thresholds, e.g., stored in a look-up table, corresponding to the speed limit of the road 200. The look-up table may be stored, e.g., in a memory of the first computer 110. When the average speed of the vehicles 105, 215 operating in the first lane 205 is less than or equal to the first speed threshold, the first computer 110 determines the first speed probability is one.

When the average speed of the vehicles 105, 215 operating in the first lane 205 is greater than the first speed threshold, the first computer 110 can then compare the average speed of the vehicles 105, 215 operating in the first lane 205 to a second speed threshold. That is, the second speed threshold is greater than the first speed threshold. The second speed threshold specifies a maximum speed of vehicles operating in a lane above which the first computer 110 can determine a traffic density for the lane is less than a saturation point of the lane. The second speed threshold may be determined based on the speed limit of the road 200. For example, the second speed threshold may be a predetermined percentage, e.g., 75%, of the speed specified by the speed limit of the road 200. That is, the first computer 110 can determine the second speed threshold by multiplying the predetermined percentage (e.g., stored in a memory of the first computer 110) and the speed limit for the road 200.

As another example, the first computer 110 can select the second speed threshold from a plurality of second speed thresholds, e.g., stored in a look-up table or the like, corresponding to the speed limit of the road 200. The look-up table may be stored, e.g., in a memory of the first computer 110. When the average speed of the vehicles 105, 215 operating in the first lane 205 is greater than or equal to the second speed threshold, the first computer 110 determines the first speed probability is zero.

When the average speed of the vehicles 105, 215 operating in the first lane 205 is between the first and second speed thresholds, the first computer 110 can determine the first speed probability as a function of the first and second speed thresholds. For example, the function may be a linear function:

$$P(\text{Speed} \mid \text{Traffic})_1 = \frac{-v_1}{(t_2 - t_1)} + \frac{t_2}{t_1} \quad (3)$$

where P(Speed|Traffic)$_1$ is the first speed probability, v$_1$ is the average speed of the vehicles 105, 215 operating in the first lane 205, t$_1$ is the first speed threshold, and t$_2$ is the second speed threshold.

The first computer 110 can determine the average speed v$_1$ of vehicles 105, 215 operating in the first lane 205 by averaging the speed of the host vehicle 105 and the speed of each lead vehicle 215. That is, the first computer 110 can sum the speeds of each vehicle 105, 215 and divide by a number of vehicles 105, 215 operating in the first lane 205 (i.e., one more than a number of lead vehicles 215 detected).

The first computer 110 can determine the speed of the host vehicle 105 based on sensor 115 data. For example, a vehicle speed sensor can output a vehicle speed, i.e., a rate of movement of the vehicle, typically in a forward direction, with respect to a ground surface such as a road. For example, one or more conventional wheel speed sensors can be provided to detect a rate of rotation of vehicle wheels, from which a speed of the vehicle can be determined. Alternatively or additionally, a vehicle speed sensor can detect a rate of rotation of a crankshaft, from which the vehicle speed can be determined.

The first computer 110 can, for example, determine the speed of the lead vehicle(s) 215 based on sensor 115 data. The first computer 110 may determine the speed of each lead vehicle 215 relative to the host vehicle 105 by determining a change in distance between the respective lead vehicle 215 and the host vehicle 105 over time. For example, the first computer 110 can determine the speed of each lead vehicle 215 relative to the host vehicle 105 with the formula ΔD/ΔT, where ΔD is a difference between a pair of distances from the host vehicle 105 to the respective lead vehicle 215 taken at different times and ΔT is an amount of time between when the pair of distances was determined. For example, the difference between the pair of distances ΔD may be determined by subtracting the distance determined earlier in time from the distance determined later in time. In such an example, a positive value indicates that the respective lead vehicle 215 is traveling slower than the host vehicle 105, and a negative value indicates that the respective lead vehicle 215 is traveling faster than the host vehicle 105. The first computer 110 can then combine, e.g., add, the speed of the host vehicle 105 to the speed of the respective lead vehicle 215 relative to the host vehicle 105 to determine the speed of each lead vehicle 215. Additionally, or alternatively, the first computer 110 may receive the speed of each lead vehicle 215, e.g., via V2V communications.

To determine the second speed probability, the first computer 110 compares an average speed of the target vehicles 220 operating in the respective second lane 210 to the first and second thresholds, as discussed above. When the average speed of the target vehicles 220 operating in the respective second lane 210 is less than or equal to the first speed threshold, the first computer 110 determines the second speed probability is one. When the average speed of the target vehicles 220 operating in the respective second lane 210 is greater than or equal to the second threshold, the first computer 110 determines the second speed probability is zero. When the average speed of the target vehicles 220 operating in the respective second lane 210 is between the first and second speed thresholds, the first computer 110 can determine the second speed probability as a function of the first and second threshold, e.g., according to an equation substantially similar to Equation 3 above.

The first computer 110 can determine the average speed v$_2$ of the target vehicles 220 operating in the respective second lane 210 by averaging the speed of each detected target vehicle 220. That is, the first computer 110 can sum the speeds of each target vehicle 220 operating in the respective second lane 210 and divide by a number of target vehicles 220 operating in the respective second lane 210.

The first computer 110 can, for example, determine a speed of the target vehicle(s) 220 operating in the respective second lane 210 based on sensor 115 data. The first computer 110 may determine the speed of each target vehicle 220 relative to the host vehicle 105 by determining a change in distance between the target vehicle 220 and the host vehicle 105 over time, e.g., in substantially the same manner as determining the speed of each lead vehicle 215. The first computer 110 can then combine, e.g., add, the speed of the host vehicle 105 to the speed of the respective target vehicle 220 relative to the host vehicle 105 to determine the speed of each target vehicle 220. Additionally, or alternatively, the first computer 110 may receive the speed of each target vehicle 220, e.g., via V2V communications.

The first computer 110 can determine P(Distance|Traffic) based on an average distance between vehicles 105, 215, 220 operating on the road 200. For example, the first computer 110 can determine an average distance between the host vehicle 105 and a lead vehicle 215 immediately in front of the host vehicle 105 based on sensor 115 data. Additionally, the first computer 110 can determine an average distance between the lead vehicles 215 operating in the first lane 205 and an average distance between the target vehicles 220 operating in each valid second lane 210 based on sensor 115 data and/or data received from one or more remote computers, e.g., the remote server computer 140, a computer in another vehicle, etc. That is, the first computer 110 may ignore invalid second lanes 210 when determining P(Distance|Traffic). Based on the respective average distances, the first computer 110 can determine a distance probability for the first lane 205 given the traffic density for the first lane 205 is greater than or equal to the saturation point of the first lane 205 (herein after referred to as a "first distance probability") and a distance probability for each valid second lane 210 given the traffic density for the respective second lane 210 is greater than or equal to the saturation point of the respective second lane 210 (herein after referred to as a "second distance probability").

The first computer 110 can then combine (e.g., by averaging and/or using some other statistical measure) the first distance probability and the second distance. The first computer 110 can, for example, determine P(Distance|Traffic) based on Equation 4 below:

$$P(\text{Distance} \mid \text{Traffic}) = \frac{\sum_{L=1}^{n+1} P(\text{Distance} \mid \text{Traffic})_L}{n+1} \quad (4)$$

where P(Distance|Traffic)$_L$ represents a distance probability for a lane 205, 210 given a traffic density for the lane 205,

210 is greater than or equal to a saturation point of the lane 205, 210, and n is a number of valid second lanes 210 on a road 200.

To determine the first distance probability, the first computer 110 compares the average distance between vehicles 105, 215 operating in the first lane 205 to a first distance threshold. The first distance threshold specifies a minimum distance between vehicles operating in a lane below which the first computer 110 can determine a traffic density for the lane is greater than or equal to a saturation point of the lane. The first distance threshold may be determined based on the speed limit of the road 200. For example, the first distance threshold can be determined as a function, e.g., a linear function, of the speed limit of the road 200. In such an example, the first distance threshold may be directly proportional to the speed limit of the road 200.

As another example, the first computer 110 can select the first distance threshold from a plurality of first distance thresholds, e.g., stored in a look-up table, corresponding to the speed limit of the road 200. The look-up table may be stored, e.g., in a memory of the first computer 110. When the average distance between vehicles 105, 215 operating in the first lane 205 is less than or equal to the first distance threshold, the first computer 110 determines the first distance probability is one.

When the average distance between vehicles 105, 215 operating in the first lane 205 is greater than the first distance threshold, the first computer 110 compares the average distance between vehicles 105, 215 operating in the first lane 205 to a second distance threshold. That is, the second distance threshold is greater than the first distance threshold. The second distance threshold specifies a maximum distance between vehicles operating in the lane above which the first computer 110 can determine the traffic density for the lane is less than the saturation point of the lane. The second distance threshold may be determined based on the speed limit of the road 200. For example, the second distance threshold can be determined as a function, e.g., a linear function, of the speed limit of the road 200. In such an example, second first distance threshold may be directly proportional to the speed limit of the road 200.

As another example, the first computer 110 can select the second distance threshold from a plurality of second distance thresholds, e.g., stored in a look-up table or the like, corresponding to the speed limit of the road 200. The look-up table may be stored, e.g., in a memory of the first computer 110. When the average distance between the vehicles 105, 215 operating in the first lane 205 is greater than or equal to the second distance threshold, the first computer 110 determines the first distance probability is zero.

When the average distance between the vehicles 105, 215 operating in the first lane 205 is between the first and second distance thresholds, the first computer 110 can determine the first distance probability as a function of the first and second distance thresholds. For example, the function may be a linear function:

$$P(\text{Distance} | \text{Traffic})_1 = \frac{-d_1}{(t_4 - t_3)} + \frac{t_4}{t_3} \tag{5}$$

where $P(\text{Distance}|\text{Traffic})_1$ is the first distance probability, $d_1$ is the average distance between the vehicles 105, 215 operating in the first lane 205, $t_3$ is the first distance threshold, and $t_4$ is the second distance threshold.

The first computer 110 can determine the average distance $d_1$ between vehicles 105, 215 operating in the first lane 205 based on sensor 115 data and data received from a remote computer, e.g., the remote server computer 140, a computer in a lead vehicle 215, etc. For example, the first computer 110 can then determine the average distance $d_1$ between vehicles 105, 215 operating in the first lane 205 according to Equation 6 below:

$$d_1 = \frac{L_1 - \sum_{1}^{X} L_v + D}{X} \tag{6}$$

where $L_1$ is a length of the first lane 205 detectable by host vehicle 105 sensors 115, $L_v$ is a length of a lead vehicle 215, X is the number of lead vehicles 215 operating in the first lane 205, and D is a distance from the host vehicle 105 to a lead vehicle 215 immediately in front of the host vehicle 105.

The first computer 110 can, for example, determine the number X of lead vehicles 215 operating in the first lane 205 by counting lead vehicles 215 identified in image data, e.g., using image processing techniques, as discussed above. The first computer 110 can determine the length of the first lane 205 $L_1$ detectable by host vehicle 105 sensors 115 based on fields of view of the sensors 115, e.g., stored in a memory of the first computer 110. In such an example, the first computer 110 can receive, e.g., via V2V communication, image data from a plurality of vehicles 215, 220 operating on the road 200. In this situation, the first computer 110 can then combine (e.g., by averaging or some other statistical measure) the number X of lead vehicles 215 in the host vehicle 105 sensor 115 data and the number X of lead vehicles 215 in the received sensor data to determine the number X of lead vehicles 215 in the first lane 205. Additionally, or alternatively, the first computer 110 can receive the number X of lead vehicles 215 operating in the first lane 205 from the remote server computer 140, e.g., via the network 135. In such an example, the remote server computer 140 can receive image data from a plurality of sensors, e.g., vehicle sensors, infrastructure sensors, etc., having a field of view including the road 200. The remote server computer 140 can then count the number X of lead vehicles 215 and provide the number X of lead vehicles 215 to the first computer 110.

The first computer 110 can determine a length $L_v$ of each lead vehicle 215 based on image data. For example, the first computer 110 can determine a type of the lead vehicle 215 based on image data, e.g., by using image recognition techniques. The first computer 110 can then determine one or more vehicle parameters, e.g., dimensions (e.g., height, length, width), a turning radius, a wheelbase, etc., based on the type of the lead vehicle 215. For example, the first computer 110 may store, e.g., in a memory, a look-up table or the like that associates vehicle parameters with a type of the lead vehicle 215. Additionally, or alternatively, the first computer 110 can receive the length $L_v$ of each lead vehicle 215, e.g., via V2V communications.

The first computer 110 can determine the distance D between the host vehicle 105 and the lead vehicle 215 immediately in front of the host vehicle 105 based on sensor 115 data. For example, a lidar sensor 115 uses laser light transmissions (instead of radio transmissions) to obtain reflected light pulses from objects, e.g., the lead vehicle 215. The reflected light pulses can be measured to determine object distances. Data from the lidar sensor 115 can be provided to generate a three-dimensional representation, sometimes referred to as a point cloud, of a detected detecting environment including objects therein.

Additionally, or alternatively, the first computer 110 can receive data from each lead vehicle 215 operating in the first lane 205, e.g., via V2V communications. In such an example, the received data specifies a distance between the lead vehicle 215 and another lead vehicle 215 immediately in front of the target vehicle 220. The first computer 110 can then determine an average of the distances between lead vehicles 215 and the distance D between the host vehicle 105 and the lead vehicle 215 immediately in front of the host vehicle 105. That is, the first computer 110 can sum the distances between the lead vehicles 215 and the distance D and divide by one plus the number of lead vehicles 215.

To determine the second distance probability, the first computer 110 compares the average distance between target vehicles 220 to the first and second distance thresholds, as discussed above. When the average distance between target vehicles 220 is less than or equal to the first distance threshold, the first computer 110 determines the second distance probability is one. When the average distance between target vehicles 220 is greater than or equal to the second distance threshold, the first computer 110 determines the second distance probability is zero. When the average distance between target vehicles 220 is between the first and second distance thresholds, the first computer 110 can determine the second distance probability as a function of the first and second distance thresholds, e.g., according to an equation substantially similar to Equation 5 above.

The first computer 110 can determine the average distance $d_2$ between target vehicles 220 operating in the respective second lane 210 based on sensor 115 data. For example, the first computer 110 can then determine the average distance $d_2$ between target vehicles 220 according to Equation 7 below:

$$d_2 = \frac{L_2 - \sum_{1}^{Y} L_T}{Y} \quad (7)$$

where $L_s$ is a length of the respective second lane 210 detectable by host vehicle 105 sensors 115, $L_T$ is a length of a target vehicle 220, and Y is the number of target vehicles 220 operating in the respective second lane 210.

The first computer 110 can determine the number Y of target vehicles 220 operating in the respective second lane 210 by counting target vehicles 220 identified in image data, e.g., using image processing techniques, as discussed above. Additionally, or alternatively, the first computer 110 can receive the number Y of target vehicles 220 operating in the respective second lane 210 from the remote server computer 140, e.g., via the network, as discussed above. The first computer 110 can determine the length of the respective second lane 210 $L_2$ detectable by host vehicle 105 sensors 115 based on fields of view of the sensors 115, e.g., stored in a memory of the first computer 110.

The first computer 110 can determine a length $L_T$ of each target vehicle 220 based on image data. For example, the first computer 110 can determine a type of the lead vehicle 215 based on image data, e.g., by using image recognition techniques. The first computer 110 can then determine one or more vehicle parameters, e.g., dimensions (e.g., height, length, width), a turning radius, a wheelbase, etc., based on the type of the target vehicle 220. For example, the first computer 110 may store, e.g., in a memory, a look-up table or the like that associates vehicle parameters with a type of the target vehicle 220 Additionally, or alternatively, the first computer 110 can receive the length $L_T$ of each target vehicle 220, e.g., via V2V communications.

As another example, the first computer 110 can determine the average distance $d_2$ between target vehicles 220 operating in the respective second lane 210 based on data received from the target vehicles 220, e.g., via V2V communications. In such an example, the first computer 110 can receive data from each target vehicle 220 that specifies a distance between the target vehicle 220 and another target vehicle 220 immediately in front of the target vehicle 220. The first computer 110 can then sum the distances and divide by the number of target vehicles 220.

The first computer 110 can determine P(Brake|Traffic) based on an average number of braking events performed by vehicles 105, 215, 220 operating on the road 200. As used herein, a "braking event" is an actuation of a brake component to reduce a speed of a vehicle. The first computer 110 can, for example, determine an average number of braking events performed by the host vehicle 105 based on sensor 115 data. Additionally, the first computer 110 can determine an average number of braking events performed by lead vehicles 215 operating in the first lane 205 and an average number of braking events performed by target vehicles 220 operating in each valid second lane 210 based on sensor 115 data and/or data received from one or more remote computers, e.g., the remote server computer 140, a computer in another vehicle, etc. That is, the first computer 110 may ignore invalid second lanes 210 when determining P(Brake|Traffic). Based on the respective average number of braking events, the first computer 110 can determine a braking probability for the first lane 205 given the traffic density for the first lane 205 is greater than or equal to the saturation point of the first lane 205 (herein after referred to as a "first braking probability") and a braking probability for each valid second lane 210 given the traffic density for the respective second lane 210 is greater than or equal to the saturation point of the respective second lane 210 (herein after referred to as a "second braking probability").

The first computer 110 can then combine (e.g., by averaging and/or using some other statistical measure) the first braking probability and the second braking probability. The first computer 110 can, for example, determine P(Brake|Traffic) based on Equation 8 below:

$$P(\text{Brake} | \text{Traffic}) = \frac{\sum_{L=1}^{n+1} P(\text{Brake} | \text{Traffic})_L}{n+1} \quad (8)$$

where P(Brake|Traffic)$_L$ represents a braking probability for a lane 205, 210 given a traffic density for the lane 205, 210 is greater than or equal to a saturation point of the lane 205, 210, and n is a number of valid second lanes 210 on a road 200.

To determine the first braking probability, the first computer 110 can compare the number of braking events performed by the vehicles 105, 215 in the first lane 205 to a first braking threshold. The first braking threshold specifies a maximum number of braking events performed by vehicles in a lane above which the first computer 110 can determine a traffic density for the lane is greater than or equal to a saturation point of the lane. The first braking threshold may be determined based on a type of the road 200. For example, the first computer 110 can select the first braking threshold from a plurality of first braking thresholds, e.g., stored in a look-up table or the like, corresponding to the type of the road 200. The look-up table may be stored, e.g., in a memory of the first computer 110. When the number of braking events performed by the vehicles 105, 215 in the first lane 205 is greater than or equal to the first braking threshold, the first computer 110 determines the first braking probability is one.

When the number of braking events performed by vehicles 105, 215 in the first lane 205 is less than the first braking threshold, the first computer 110 can compare the number of braking events performed by the vehicles 105, 215 in the first lane 205 to a second braking threshold. That is, the second braking threshold is less than the first braking threshold. The second braking threshold specifies a minimum number of braking events performed by vehicles in a lane below which the first computer 110 can determine a traffic density for the first lane 205 is less than a saturation point of the first lane 205. The second braking threshold may be determined based on the type of the road 200. For example, the first computer 110 can select the second braking threshold from a plurality of second braking thresholds, e.g., stored in a look-up table or the like, corresponding to the type of the road 200. The look-up table may be stored, e.g., in a memory of the first computer 110. When the number of braking events performed by the vehicles 105, 215 operating in the first lane 205 is less than or equal to the second braking threshold, the first computer 110 determines the first braking probability is zero.

When the number of braking events performed by the vehicles 105, 215 operating in the first lane 205 is between the first and second braking thresholds, the first computer 110 can determine the first braking probability as a function of the first and second braking thresholds. For example, the function may be a linear function:

$$P(\text{Brake} \mid \text{Traffic})_1 = \frac{-b_1}{(t_5 - t_6)} + \frac{t_5}{t_6} \quad (9)$$

where $b_1$ is the number of braking events performed by vehicles 105, 215 operating in the first lane 205, $t_5$ is the first speed threshold, and $t_6$ is the second speed threshold.

The first computer 110 can determine the average number of braking events $b_1$ performed by the vehicles 105, 215 operating in the first lane 205 by averaging the number of braking events performed by the host vehicle 105 and the number of braking events performed by each lead vehicle 215. That is, the first computer 110 can sum the number of braking events performed by each vehicle 105, 215 operating in the first lane 205 and divide by the number of vehicles 105, 215 operating in the first lane 205 (i.e., one more than a number of lead vehicles 215 detected, as discussed above).

The first computer 110 can record the number of braking events performed by the vehicles 105, 215 operating in the first lane 205. That is, upon determining a braking event is performed by the vehicles 105, 215 operating in the first lane 205, the first computer 110 can count that instance of a performed braking event. For example, the first computer 110 can store the number of braking events performed by the vehicles 105, 215 operating in the first lane 205 in a memory. The first computer 110 increases the number of braking events performed by the vehicles 105, 215 operating in the first lane 205, e.g., by one, upon each instance of determining a braking event is performed.

The first computer 110 can determine a braking event performed by the host vehicle 105 based on sensor 115 data. For example, the first computer 110 can detect actuation of a brake component 125 via a brake sensor 115. A brake sensor 115 can be any suitable type of sensor to measure movement of a brake pedal, including how much pressure is applied to the brake pedal. The brake sensor 115 may output a signal representing as much to the first computer 110. As one example, the first computer 110 can count each actuation of the brake component 125 as a braking event.

As another example, upon detecting actuation of a braking component 125, e.g., a brake pedal, the first computer 110 can compare the speed of the host vehicle 105 to a transition speed threshold. The transition speed threshold specifies an average speed that vehicles operate on the road 200 when the traffic density of the road 200 is at the saturation point for the road 200. That is, the transition speed threshold may be determined based on the saturation point for the road 200. The transition speed threshold may be stored, e.g., in a memory of the first computer 110. The transition speed threshold may be less than the first speed threshold. The first computer 110 can count each transition of the host vehicle 105 speed below the transition speed threshold as a braking event. That is, the first computer 110 can increase the count of the number of braking events performed by the host vehicle 105 when the speed of the host vehicle 105 decreases from a speed above the transition speed threshold to a speed below the transition speed threshold.

The first computer 110 can determine a braking event performed by a lead vehicle 215 based on sensor 115 data. For example, the first computer 110 can detect actuation of brake lights on the lead vehicle 215 via image data, e.g., using image processing techniques. In such an example, the first computer 110 can count each actuation of brake lights on the lead vehicle 215 as a braking event. As another example, upon detecting actuation of the brake lights on the lead vehicle 215, the first computer 110 can compare the speed of the lead vehicle 215 to the transition speed threshold. The first computer 110 can count each transition of the lead vehicle 215 speed below the transition speed threshold as a braking event. That is, the first computer 110 can increase the count of the number of braking events performed by the lead vehicle 215 when the speed of the lead vehicle 215 decreases from a speed above the transition speed threshold to a speed below the transition speed threshold. Additionally, or alternatively, the first computer 110 can receive data indicating a braking event performed by the lead vehicle 215, e.g., via V2V communications. In such an example, the first computer 110 can increase the number of braking events performed by the lead vehicle 215 based on the received data.

To determine the second braking probability, the first computer 110 can compare the number of braking events performed by the target vehicles 220 operating in the respective second lane 210 to the first and second braking thresholds, as discussed above. When the number of braking events performed by the target vehicles 220 operating in the respective second lane 210 is greater than or equal to the first braking threshold, the first computer 110 determines the second braking probability is one. When the number of braking events performed by the target vehicles 220 operating in the respective second lane 210 is less than or equal to the second braking threshold, the first computer 110 determines the second braking probability is zero. When the number of braking events performed by the target vehicles 220 operating in the respective second lane 210 is between the first and second braking thresholds, the first computer 110 can determine the second braking probability as a function of the first and second braking thresholds, e.g., according to an equation in or similar to the form of Equation 9 above.

The first computer 110 can determine the average number of braking events performed by the target vehicles 220 operating in the respective second lane 210 by averaging the number of braking events performed by the target vehicles 220 operating in the respective second lane 210. That is, the first computer 110 can sum the number of braking events performed by each target vehicle 220 operating in the respective second lane 210 and divide by the number of target vehicles 220 operating in the respective second lane 210.

The first computer 110 can record a number of braking events performed by a target vehicle 220 operating in the respective second lane 210. That is, upon determining a braking event is performed by a target vehicle 220, the first computer 110 can count that instance of a performed braking event. For example, the first computer 110 can store the number of braking events performed by the target vehicle 220 in a memory. The first computer 110 increases the number of braking events performed by the target vehicle 220, e.g., by one, upon each instance of determining a braking event is performed. The first computer 110 can determine a braking event performed by a target vehicle 220 in substantially the same manner as a lead vehicle 215 (as discussed above).

The first computer 110 may be programmed to reset the number of braking events performed by the vehicles 105, 215, 220 to zero based on sensor 115 data. For example, the first computer 110 can reset the number of braking events performed by each vehicle 105 215, 220 based on the speed of the respective vehicle 105, 215, 220 exceeding a threshold. The threshold is determined based on the speed limit of the road 200. For example, the threshold may be determined as a function, e.g., a linear function, of the speed limit. The first computer 110 can select the threshold from a plurality of thresholds, e.g., stored in a look-up table, corresponding to the speed limit of the road 200. The look-up table may be stored, e.g., in a memory of the first computer 110. The threshold is greater than the transition speed threshold. The threshold may be between the first and second speed thresholds. When the speed of the respective vehicle 105, 215, 220 exceeds the threshold, the first computer 110 can reset the number of braking events performed by the respective vehicle 105, 215, 220 to zero.

Additionally, or alternatively, the first computer 110 can reset the number of braking events performed by each vehicle 105, 215, 220 based on the number of braking events performed by the respective vehicle 105, 215, 220 remaining constant for a predetermined time. The predetermined time may be determined empirically, e.g., by determining an average time between performed braking events by vehicles travelling along a road 200 when the traffic density of the road 200 is at the saturation point for the road 200. The predetermined time may be stored, e.g., in a memory of the first computer 110. The first computer 110 can, for example, initiate a timer upon determining a braking event. The timer can have a duration equal to the predetermined time. The first computer 110 can reset the number of braking events performed by the respective vehicle 105, 215, 220 based on detecting no subsequent braking event performed by the respective vehicle 105, 215, 220 prior to the expiration of the timer.

Additionally, or alternatively, the first computer 110 can reset the number of braking events performed by each vehicle 105, 215, 220 based on, e.g., the classifier (as discussed above), detecting no vehicle operating in front of the respective vehicle 105, 215, 220 and in the same lane 205, 210 as the respective vehicle 105, 215, 220. As another example, the first computer 110 can reset the number of braking events performed by each vehicle 105, 215, 220 based on a distance between the respective vehicle 105, 215, 220 and an adjacent vehicle in the same lane 205, 210 being greater than a threshold. The threshold may be determined empirically, e.g., by determining an average distance between vehicles operating on the road 200 when the traffic density of the road 200 is at the saturation point for the road 200. The threshold may be stored, e.g., in a memory of the first computer 110.

The first computer 110 can determine the distance between adjacent vehicles 105, 215, 220 based on sensor 115 data. For example, the first computer 110 can determine the distance D between the host vehicle 105 and the lead vehicle 215 immediately in front of the host vehicle 105 based on data from a lidar sensor 115, as discussed above.

The first computer 110 can determine a distance between adjacent lead vehicles 215 by determining a distance from the respective lead vehicle 215 to the host vehicle 105, e.g., using data from a lidar sensor 115 as discussed above. The first computer 110 can then subtract the respective distances to determine the distance between adjacent lead vehicles 215. Additionally, or alternatively, the first computer 110 can receive a distance from one lead vehicle 215 to another lead vehicle 215, e.g., via V2V communications. In such an example, the first computer 110 can receive data from each lead vehicle 215 indicating a distance between the lead vehicle 215 and a vehicle immediately in front of the respective lead vehicle 215.

Additionally, to determine a distance between adjacent target vehicles 220, the first computer 110 can, for example, employ free space computation techniques to image data that identifies a range of pixel coordinates associated with a target vehicle 220 and free space (i.e., space in which no object is detected) between the target vehicle 220 and the host vehicle 105. By identifying a set of pixel coordinates in an image associated with the free space and the target vehicle 220 and determining a distance (in pixel coordinates) from an image sensor 115 lens, e.g., across the free space, to the target vehicle 220 pixel coordinates, the first computer 110 can then determine a distance, e.g., across the free space, of the image sensor 115 lens from the target vehicle 220. That is, according to known techniques, the first computer 110 can determine a distance from the lens to the identified coordinates (in pixel coordinates) and can further determine, from the image an angle between a line from the sensor 115 lens to a point on the target vehicle 220, and an axis extending from the lens parallel to a longitudinal axis of the host vehicle 105. Then, using trigonometric functions based on (i) a line extending from the sensor 115 lens to the point on the target vehicle 220, (ii) a line extending from the sensor 115 lens along the axis, and (iii) a line that intersects the point on the target vehicle 220 and with which the line extending along the axis forms a right angle, the first computer 110 can determine a length of the line drawn parallel to the host vehicle 105 longitudinal axis from (a) an axis extending from the sensor 115 lens parallel to a lateral axis of the host vehicle 105 to (b) the point on the target vehicle 220. By repeating this process for the vehicle immediately in front or, or behind, the target vehicle 220 and subtracting the lengths of two lines parallel to the host vehicle 105 longitudinal axis and drawn from the axis extending from the sensor 115 lens parallel to the lateral axis of the host vehicle 105 to the respective points on the vehicles, the distance may be determined.

The first computer 110 can then determine the distance between adjacent target vehicles 220 by subtracting the distance from the host vehicle 105 to one target vehicle 220 from the distance from the host vehicle 105 to the other target vehicle 220. Additionally, or alternatively, the first computer 110 can receive a distance from one target vehicle 220 to another target vehicle 220, e.g., via V2V communications. In such an example, the first computer 110 can receive data from each target vehicle 220 indicating a distance between the target vehicle 220 and a vehicle immediately in front of the respective target vehicle 220.

Figure 4:
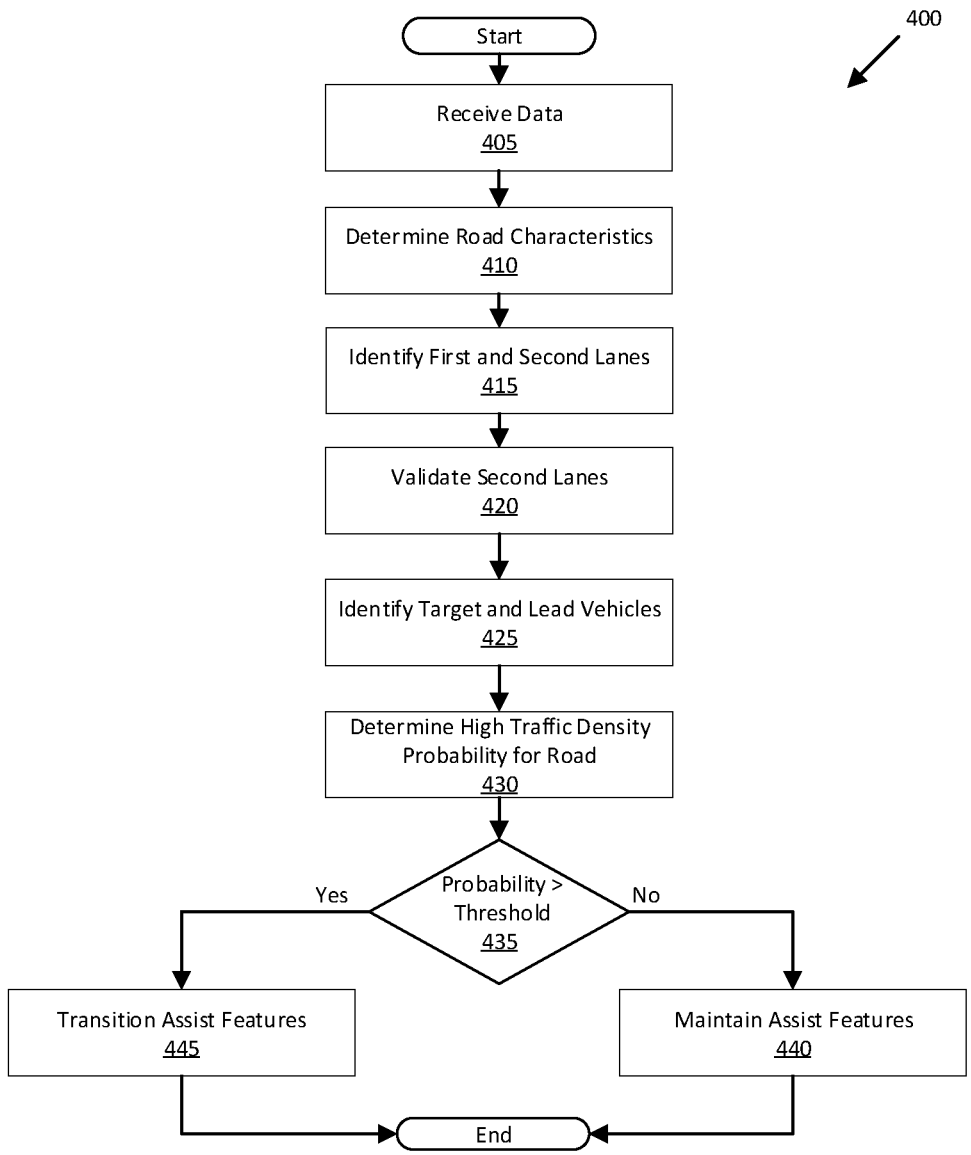
FIG. 4 is a flowchart of an example process for determining a high traffic density probability for a road.

FIG. 4 is a diagram of an example process 400 for determining a high traffic density probability for a road 200. The process 400 begins in a block 405. The process 400 can be carried out by a first computer 110 included in the vehicle 105 executing program instructions stored in a memory thereof.

In the block 405, the first computer 110 receives data from one or more sensors 115, e.g., via a vehicle network, from a remote server computer 140, e.g., via a network 135, and/or from a computer in another vehicle, e.g., via V2V communications. For example, the first computer 110 can receive image data, e.g., from one or more image sensors 115. The image data may include data about the environment around the host vehicle 105, e.g., another vehicle operating on the road 200, such as a lead vehicle 215 in the first lane 205 and/or a target vehicle 220 operating in a second lane 210, lane markings, etc. Additionally, the first computer 110 can receive map data, e.g., from a remote server computer 140 via the network 135, including a GPS-based geo-fence specifying a perimeter of one or more roads. The process 400 continues in a block 410.

In the block 410, the first computer 110 can determine characteristics of a current road 200 of host vehicle 105 operation. For example, the first computer 110 can identify a current road 200 of host vehicle operation 105 based on a location of the host vehicle 105 being within a geo-fence of the current road 200, as discussed above. Upon identifying the current road 200, the first computer 110 can identify one or more road characteristics, e.g., based on map data, and/or a type of the current road 200, e.g., according to a look-up table, as discussed above. The process 400 continues in a block 415.

In the block 415, the first computer 110 identifies a first lane 205, i.e., a lane in which the host vehicle 105 is operating, and one or more second lanes 210, i.e., a lane in which the host vehicle 105 is not operating, on the road 200. For example, the first computer 110 can identify the lanes 205, 210 based on sensor 115 data. That is, the first computer 110 can be programmed to receive sensor 115 data, typically image data, from sensors 115 and to implement various image processing techniques to identify lanes 205, 210, as discussed above. The process 400 continues in a block 420.

In the block 420, the first computer 110 determines whether each second lane 210 is valid or invalid. For example, the first computer 110 can validate each second lane 210 based on a direction of travel of vehicles in the respective second land 210. The first computer 110 can determine a direction of travel of vehicles in the second lane 210 based on sensor 115 data, as discussed above. When the direction of travel of vehicles in the respective second land 210 is the same as a direction of travel of vehicles in the first lane 205, the first computer 110 can validate the respective second lane 210. Conversely, when the direction of travel of vehicles in the respective second land 210 is in an opposite direction of travel as the direction of travel of vehicles in the first lane 205, the first computer 110 can invalidate the second lane 210.

As another example, the first computer 110 can validate each second lane 210 based on a classification of the respective second lane 210. The first computer 110 can determine a classification of each second lane 210 based on sensor 115 data, as discussed above. When the second lane 210 is classified as a through lane (as discussed above), the first computer 110 can validate the second lane 210. Conversely, when the second lane 210 is classified as a departure lane (as discussed above), the first computer 110 can invalidate the second lane 210. The process 400 continues in a block 425.

In the block 425, the first computer 110 identifies a vehicle operating on the road 200 as a lead vehicle 215 or a target vehicle 220 based on a lane of vehicle operation. As set forth above, a target vehicle 220 is a vehicle operating in a second lane 210, and a lead vehicle 215 is a vehicle operating in the first lane 205 and forward of the host vehicle 105. For example, the first computer 110 can determine a lane of operation for an identified vehicle 215, 220 based on sensor 115 data. For example, the first computer 110 may determine the lane of operation of the identified vehicle 215, 220 by using image data to identify lane markings on each side of the identified vehicle 215, 220, e.g., according to image processing techniques, as discussed above. As another example, the first computer 110 may receive location data from the identified vehicle 215, 220, e.g., via V2V communications, specifying the lane of operation of the identified vehicle 215, 220. As another example, the classifier can be further trained with data known to represent various lanes of operation. Thus, in addition to identifying the object as a vehicle, the classifier can output an identification of a target vehicle 220 or a lead vehicle 215 based on the lane of vehicle operation, as discussed above. The process 400 continues in a block 430.

In the block 430, the first computer 110 determines a high traffic density probability for the road 200 based on operation parameters vehicles 105, 215, 220 operating on the road 200. The first computer 110 can determine the operation parameters of the vehicles 105, 215, 220 based on sensor 115 data, as discussed above. The first computer 110 can determine the high density probability based on a speed probability for the road 200 given a traffic density of the road 200 is greater than or equal to the saturation point of the road 200 P(Speed|Traffic), a distance probability for the road 200 given the traffic density of the road 200 is greater than or equal to the saturation point of the road 200 P(Distance|Traffic), and a braking probability given the traffic density of the road 200 is greater than or equal to the saturation point of the road 200 P(Brake|Traffic), e.g., according to Equation 1 above.

The first computer 110 can determine P(Speed|Traffic) based on an average speed of the vehicles 105, 215, 220 operating on the road 200. For example, the first computer 110 can determine a first speed probability for the first lane 205 based on an average speed of the vehicles 105, 215 operating in the first lane 205. Additionally, the first computer 110 can determine a second speed probability for each valid second lane 210 based on an average speed of the target vehicles 220 operating in the respective valid second lane 210. That is, the first computer 110 may ignore invalid second lanes 210 when determining P(Speed|Traffic). The first computer 110 can then combine (e.g., by averaging and/or using some other statistical measure) the first speed probability and the second speed probability, e.g., according to Equation 2 above.

The first computer 110 can determine P(Distance|Traffic) based on an average distance between vehicles 105, 215, 220 operating on the road 200. For example, the first computer 110 can determine a first distance probability for the first lane 205 based on an average distance between vehicles 105, 215 operating in the first lane 205. Additionally, the first computer 110 can determine a second distance probability for each valid second lane 210 based on an average distance between target vehicles 220 operating in the respective valid second lane 210. That is, the first computer 110 may ignore invalid second lanes 210 when determining P(Distance|Traffic). The first computer 110 can then combine (e.g., by averaging and/or using some other statistical measure) the first distance probability and the second distance probability, e.g., according to Equation 4 above.

The first computer 110 can determine P(Brake|Traffic) based on an average number of braking events performed by vehicles 105, 215, 220 operating on the road 200. For example, the first computer 110 can determine a first braking probability for the first lane 205 based on an average number of braking events performed by the vehicles 105, 215 operating in the first lane 205. Additionally, the first computer 110 can determine a second braking probability for each valid second lane 210 based on an average number of braking events performed by the target vehicles 220 operating in the respective valid second lane 210. That is, the first computer 110 may ignore invalid second lanes 210 when determining P(Braking|Traffic). The first computer 110 can then combine (e.g., by averaging and/or using some other statistical measure) the first braking probability and the second braking probability, e.g., according to Equation 9 above. The process 400 continues in a block 435.

In the block 435, the first computer 110 determines whether the high traffic density probability for the road 200 is greater than a threshold probability (as discussed above). For example, the first computer 110 can compare the high traffic density probability for the road 200 to threshold probability. When the high traffic density probability for the road 200 is less than or equal to the threshold probability, the process 400 continues in a block 440. When the high traffic density probability for the road 200 is greater than the threshold probability, the process 400 continues in a block 445.

In the block 440, the first computer 110 maintains the assist features in an enabled state or a disabled state. The first computer 110 may, for example, selectively activate one or more assist features to one of the enabled state or the disabled state based on one or more road 200 characteristics, as discussed above. For example, the first computer 110 can disable the assist feature(s) that are inappropriate or undesirable for the road 200 and can enable the assist feature(s) that are appropriate or desirable for the road 200, as discussed above. The assist feature(s) to be disabled or enabled based on the road 200 characteristic(s) may be stored in the memory of the first computer 110, e.g., in a look-up table. The first computer 110 maintains the assist features in the respective enabled state or disabled state based on the road 200 characteristics. The process 400 ends following the block 440.

In the block 445, the first computer 110 transitions one or more assist features between the enabled state and the disabled state. The assist feature(s) to be enabled or disabled based on the high traffic density probability may be specified by a vehicle and/or component manufacturer and stored in the memory of the first computer 110, e.g., in a look-up table. For example, the first computer 110 can disable one or more assist features that are typically enabled based on the characteristics of the road 200. For example, the first computer 110 may typically enable a park assist when the host vehicle 105 is operating on a city street and travelling below a predefined speed. However, upon determining the high traffic density probability is above the threshold, the first computer 110 can determine the host vehicle 105 is in a traffic jam and thus is not searching for a parking space. In this situation, the first computer can disable the park assist.

Additionally, the first computer 110 can enable one or more assist features that are typically disabled based on the characteristics of road 200. For example, the first computer 110 may typically disable assist features that autonomously operate the host vehicle 105, e.g., adaptive cruise control, lane centering, etc., when the host vehicle 105 is operating on a city street. However, upon determining the high traffic density probability is above the threshold, the first computer 110 can determine the host vehicle 105 is in a traffic jam and thus has a decreased likelihood of objects moving unexpectedly in the environment around the host vehicle 105. In this situation, the first computer 110 can enable, e.g., adaptive cruise control, lane centering, etc.

The assist feature(s) to be enabled or disabled may be determined additionally based on data, e.g., sensor 115 data, map data, etc., of the environment around the how vehicle 105. For example, the first computer 110 can disable one or more assist features associated with a host vehicle 105 lane position, e.g., lane keep assist, lane centering assist, lane departure warning, etc., based on sensor 115 data indicating an absence of lane markings on the road 200. As another example, the first computer 110 can disable one or more assist features associated with parking the host vehicle 105 based on sensor 115 data indicating, e.g., an absence of parking spaces on a side of the road 200, the host vehicle 105 moved into a departure lane, etc. Non-limiting examples of assist features include adaptive cruise control, blind spot monitor, lane departure warning, lane keep assist, lane centering, forward collision warning, park assist, etc. The process 400 ends following the block 445.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
    while operating a host vehicle in a first lane on a road, determine, based on sensor data, respective first statistical probabilities of a) an average speed of a plurality of vehicles, including the host vehicle, operating in the first lane, b) an average distance between the vehicles operating in the first lane, and c) an average number of braking events performed by the vehicles operating in the first lane;
    determine a high traffic density probability, that is a scalar value specified in a range of scalar values, indicating a likelihood that a traffic density of the road is at or above a saturation point that is a traffic density beyond which an average speed of vehicles at a point on a road decreases, for the road based on the first statistical probabilities; and
    transition a host vehicle assist feature between an enabled state and a disabled state based on the high traffic density probability for the road being greater than a threshold probability.

2. The system of claim 1, wherein the instructions further include instructions to:
    upon determining a second lane is valid, determine, based on the sensor data or further sensor data, respective second statistical probabilities of a) an average speed of a plurality of target vehicles operating in the second lane, b) an average distance between the target vehicles operating in the second lane, and c) an average number of braking events performed by the target vehicles in the second lane; and determine the high traffic density probability for the road additionally based on the second statistical probabilities.

3. The system of claim 2, wherein the instructions further include instructions to determine the high traffic density probability for the road by combining the first statistical probabilities and the second statistical probabilities.

4. The system of claim 2, wherein the instructions further include instructions to determine the second lane is invalid based on identifying the second lane as a departure lane.

5. The system of claim 2, wherein the instructions further include instructions to determine the second lane is invalid based on determining a direction of travel of a vehicle operating in the second lane is opposite a direction of travel of the host vehicle.

6. The system of claim 1, wherein the instructions further include instructions to, upon determining the average of the plurality of vehicles in the first lane is between first and second speed thresholds, determine the statistical probability of the average speed of the vehicles operating in the first lane based on the first and second speed thresholds, wherein the second speed threshold is greater than the first speed threshold.

7. The system of claim 6, wherein the instructions further include instructions to determine the first and second speed thresholds based on a speed limit for the road.

8. The system of claim 1, wherein the instructions further include instructions to, upon determining the average distance between vehicles operating in the first lane is between first and second distance thresholds, determine the statistical probability of the average distance between the vehicles operating in the first lane based on the first and second distance thresholds, wherein the second distance threshold is greater than the first distance threshold.

9. The system of claim 8, wherein the instructions further include instructions to determine the first and second distance thresholds based on a speed limit for the road.

10. The system of claim 1, wherein the instructions further include instructions to increase a count of the number of braking events performed by each vehicle of the plurality of vehicles based on detecting a speed of the respective vehicle transitioning below a transition speed threshold.

11. The system of claim 10, wherein the instructions further include instructions to reset the count of the number of braking events performed by each vehicle based on the distance between each vehicle and a vehicle in front of the respective vehicle being greater than a distance threshold.

12. The system of claim 10, wherein the instructions further include instructions to reset the count of the number of braking events performed by each vehicle based on the count remaining constant for a predetermined time.

13. The system of claim 10, wherein the instructions further include instructions to reset the count of the number of braking events performed by each vehicle based on the speed of the respective vehicle exceeding a speed threshold.

14. The system of claim 1, wherein the instructions further include instructions to maintain the host vehicle assist feature in one of the enabled state or the disabled state based on the high traffic density probability for the road being less than or equal to the threshold probability.

15. A method, comprising:
while operating a host vehicle in a first lane on a road, determining, based on sensor data, respective first statistical probabilities of a) an average speed of a plurality of vehicles, including the host vehicle, operating in the first lane, b) an average distance between the vehicles operating in the first lane, and c) an average number of braking events performed by the vehicles operating in the first lane;

determining a high traffic density probability, that is a scalar value specified in a range of scalar values, indicating a likelihood that a traffic density of the road is at or above a saturation point that is a traffic density beyond which an average speed of vehicles at a point on a road decreases, for the road based on the first statistical probabilities; and transitioning a host vehicle assist feature between an enabled state and a disabled state based on the high traffic density probability for the road being greater than a threshold probability.

16. The method of claim 15, further comprising:
upon determining a second lane is valid, determining, based on the sensor data or further sensor data, respective second statistical probabilities of a) an average speed of a plurality of target vehicles operating in the second lane, b) an average distance between the target vehicles operating in the second lane, and c) an average number of braking events performed by the target vehicles in the second lane; and determining the high traffic density probability for the road additionally based on the second statistical probabilities.

17. The method of claim 16, further comprising determining the high traffic density probability for the road by combining the first statistical probabilities and the second statistical probabilities.

18. The method of claim 15, further comprising, upon determining the average speed of the vehicles operating in the first lane is between first and second speed thresholds, determining the statistical probability of the average speed of the vehicles operating in the first lane based on the first and second speed thresholds, wherein the second speed threshold is greater than the first speed threshold.

19. The method of claim 15, further comprising, upon determining the average distance between the vehicles operating in the first lane is between first and second distance thresholds, determining the statistical probability of the average distance between the vehicles operating in the first lane based on the first and second distance thresholds, wherein the second distance threshold is greater than the first distance threshold.

20. The method of claim 15, further comprising increasing a count of the number of braking events performed by each vehicle of the plurality of vehicles based on detecting the speed of the respective vehicle transitioning below a transition speed threshold.

* * * * *